July 19, 1938.  G. W. SCHATZMAN  2,124,041
ORNAMENTAL FENDER SHIELD
Filed Dec. 21, 1936
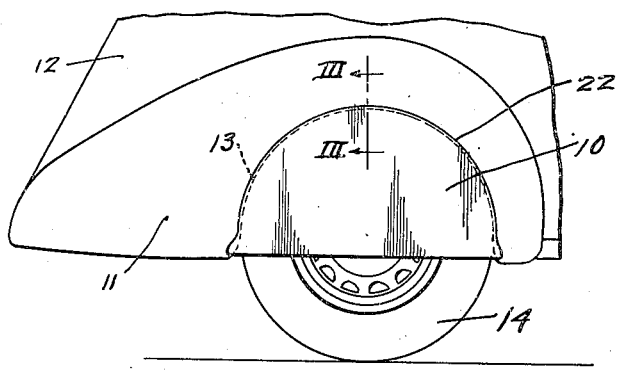
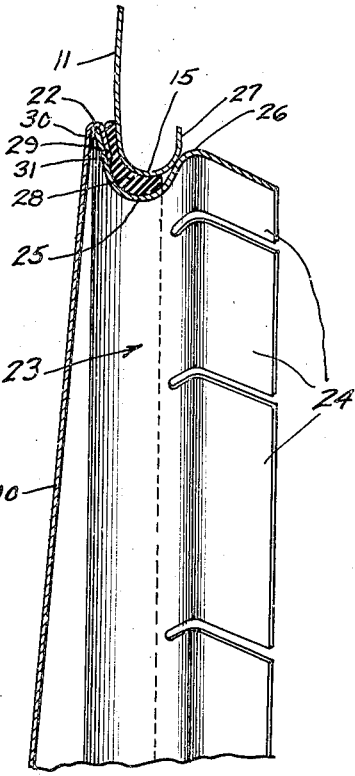
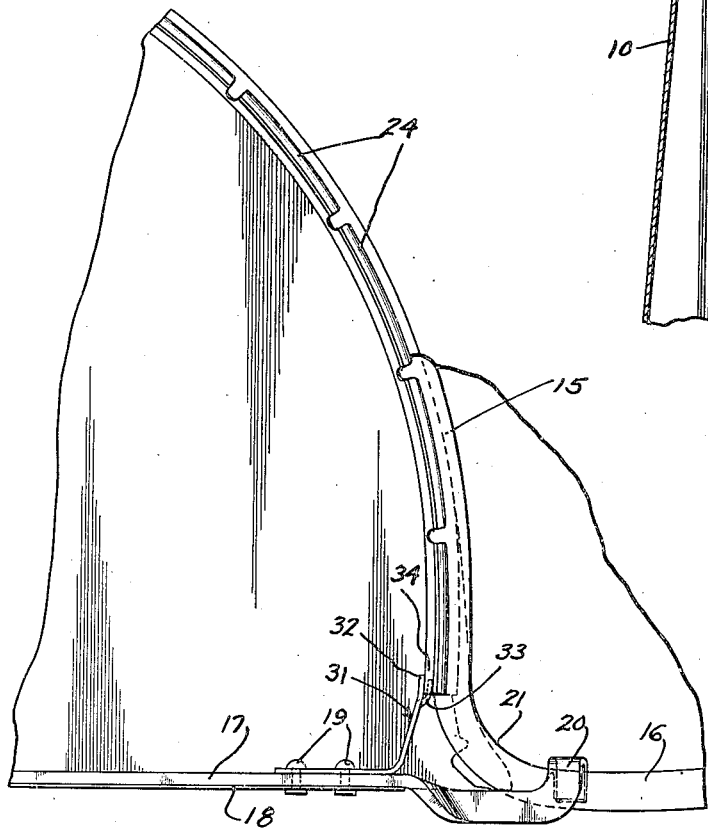
George W. Schatzman.
by Charles W. Hills Attys.

Patented July 19, 1938

2,124,041

UNITED STATES PATENT OFFICE 2,124,041

ORNAMENTAL FENDER SHIELD

George W. Schatzman, Detroit, Mich., assignor, by mesne assignments, to Houdaille-Hershey Corporation, Detroit, Mich., a corporation of Michigan Application December 21, 1936, Serial No. 116,922

7 Claims. (Cl. 280—153)

This invention relates to ornamental fender shields, and more particularly to an ornamental fender shield having a fastening flange of novel form which is secured thereto in a novel manner.

In the manufacture of ornamental fender shields, it has been found highly desirable, from the standpoint of economy of production, to construct the shield of some relatively inexpensive and soft steel. When steel of this type is used, however, difficulties are encountered due to the fact that soft steel does not readily lend itself to the formation of a fastening flange on the shield which will detachably engage a vehicle fender. This has been found to be particularly true where the fastening flange is designed to make a snap-on connection with the underturned opening defining edge of a vehicle fender. It has been found that a flange of this type should preferably be composed of spring steel or some other suitable resilient material.

It is an object of this invention to provide an ornamental fender shield of novel construction.

It is a further object of this invention to provide a novel ornamental fender shield which is economical to manufacture and which is rugged and reliable in use.

It is a still further object of this invention to provide a fender shield having a fastening flange of novel form which is secured to the fender shield in a novel manner.

Another and further object of this invention is to provide a novel method and means for securing a fender-engaging fastening flange to an ornamental fender shield.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing, in which:

Figure 1 is a front elevational view illustrating a vehicle fender and an ornamental fender shield mounted thereon;

Figure 2 is a rear elevational view of one end of a fender shield showing the manner in which it engages the underturned edge of a vehicle fender and the manner in which it is supported thereby; and Figure 3 is a greatly enlarged cross-sectional view taken along the line III—III of Figure 1.

In Figure 1 of the drawing, I have illustrated a fender shield 10 constructed in accordance with the teachings of the present invention and assembled on a rear fender 11 of an automobile 12. The fender 11 is formed with the usual opening 13 which affords access to the vehicle wheel 14 and which permits ready removal of the wheel 14 in an axial direction. The ornamental fender shield 10 is disposed over the opening 13 in such a manner as to substantially close the opening and to harmonize with the outer side wall of fender 11. The outer surface of shield 10 may, of course, be substantially smooth, as is illustrated in the drawing, or it may assume any other desired configuration for purposes of ornamentation.

As shown in Figure 2, the outer marginal edge of fender 11 which defines the opening 13 is underturned as at 15, while the outer marginal edges which define the base of the fender are underturned as at 16. As is well known by those skilled in the art, fenders of the high crown type are generally provided with these underturned edge portions to increase the rigidity of the fender. As will presently be explained, advantage is taken of this feature to assemble and secure the ornamental fender shield in the fender opening.

In order to provide a suitable support for fender shield 10, a bar 17 is secured to the base 18 of the shield in any suitable manner, such as by a plurality of bolts 19. Although only one end of fender shield 10 is illustrated in Figure 2 of the drawing, it is to be understood that the other end of fender shield is constructed and formed in an identical manner. The bar 17 is so dimensioned as to extend beyond either end of shield 10 to form trunnion members 20 which are adapted to be supported by the underturned edges 16 of fender 11. The particular configuration of trunnion members 20 may, of course, vary through wide limits without departing from the spirit and scope of the present invention, it being only necessary to shape the ends of bar 17 so that they will extend around the underturned corner 21 of fender 11 and then downwardly into engagement with the channel formed by underturned edges 16. As will presently be understood, trunnion members 20 form a convenient support for fender shield 10, and which permits the fender shield 10 to be rocked into desired position on the vehicle fender 11.

While trunnion members 20 support shield 10, it will be observed that it is necessary to provide some means which will detachably hold the curved edge 22 of shield 10 firmly against fender 11. One form of fastening means which has been found highly desirable is to provide a rearwardly extending flange 23 on shield 10 in proximity to curved edge 22 having a plurality of humped resilient fingers 24, such as is illustrated in Figures 2 and 3 of the drawing. The intermediate portion 25 of flange 23 is preferably shaped to assume approximately the same curvature as that of underturned edge 15 of fender 11, while the humped portion 26 of fingers 24 is arranged to bear against the rear face 27 of underturned edge 15. It will thus be apparent that as fender shield 10 is rocked into desired position about trunnion members 20 fingers 24 are cammed under underturned edge 15 of fender 11 and as the humped portion 26 of fingers 24 passes beneath the lowermost point of underturned edge 15 fingers 24 snap up against rear surface 27 to hold fender shield 10 in tight engagement with fender 11. A cushioning ring 28 of rubber or some other suitable material may be disposed in the channel formed by intermediate portion 25 of flange 23 to prevent rattling if desired.

Inasmuch as it is desirable to construct flange 23 of some suitable resilient material such as spring steel, and inasmuch as it is desirable from the standpoint of manufacturing cost to construct fender shield 10 of some material which is cheaper to manufacture such for example as soft steel, the present invention provides a novel arrangement whereby the fender shield assembly may be constructed in a novel manner of a plurality of elements. To this end curved edge 22 of fender shield 10 is bent back on itself as at 29 to form a recess 30. A separate flange element having a cross-sectional configuration as illustrated in Figure 3 and having a forward radially outwardly extending edge 31 is constructed of some suitable resilient material such as spring steel. Edge 31 of flange 33 is then disposed in recess 30.

One method of retaining edge 31 of flange 23 in recess 30 of fender shield 10 so as to make the flange a unitary part of the fender shield assembly is illustrated in Figure 2 of the drawing. An upwardly extending arm 31 is secured on top of trunnion bar 17 at each of the two lower corners of the fender shield 10. The upper end 32 of arm 31 has a centrally disposed tongue 33 cut out thereof and bent outwardly and upwardly as indicated in the drawing. The lower ends 34 of flange 23 are adapted to lie between the upper end 32 and tongue 33 of arm 31 to be supported thereby. Arm 31 may be either first secured to trunnion bar 17 by means of bolts 19 and then the flange 23 sprung into place, or the flange 23 may be disposed in recess 30 and then the arm 31 hooked over the lower end 34 thereof and bolted in place by means of bolts 19.

By detachably securing flange 23 on fender shield 10 it will at once be appreciated that this unit of the fender shield assembly may be readily replaced whenever the resiliency of the material of the flange decreases to a point which renders the flange undesirable for further use. If desired, however, forward end 31 of flange 23 may be permanently secured to fender shield 10 in some suitable manner such as by welding or crimping of edge 29 of fender shield 10. When flange 23 is welded or otherwise permanently secured to fender shield 10, arm 31 may, of course, be omitted if desired.

From the above description it will be apparent that I have provided an extraordinarily simple fender shield assembly construction which is economical to manufacture and which permits the fender shield proper to be constructed of a material different from that of the fender shield fastening flange.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender shield having a curved edge and a substantially straight edge, said curved edge being bent back on itself to form a recess, a flange element having an edge thereof loosely disposed within said recess, and means disposed adjacent the ends of said flange element for retaining said flange element in said recess, said flange element including means adapted to detachably secure said shield in desired position on a vehicle fender.

2. As an article of manufacture, an ornamental fender shield having a curved edge and a substantially straight edge, said curved edge being bent back on itself to form a recess, a flange element having an edge thereof loosely disposed within said recess, and means for constantly urging said flange edge into said recess, said flange element including means adapted to detachably secure said shield in desired position on a vehicle fender.

3. As an article of manufacture, an ornamental fender shield having a curved edge and a substantially straight edge, said curved edge being bent back on itself to form a recess, a flange element having a serrated edge and a relatively smooth edge, said smooth edge being loosely disposed in said recess and said serrated edge being shaped to provide a plurality of fingers adapted to engage the wheel opening defining edge of a vehicle fender, and means for detachably retaining said straight edge of said flange in said recess.

4. As an article of manufacture, an ornamental fender shield having a curved edge and a substantially straight edge, said curved edge being bent back on itself to form a recess, a flange element having a serrated edge and a relatively smooth edge, said smooth edge being loosely disposed within said recess and said serrated edge being shaped to provide a plurality of fingers adapted to engage the wheel opening defining edge of a vehicle fender, and means for detachably retaining said straight edge of said flange in said recess, said flange also being shaped between its serrated edge and its smooth edge to provide a radially outwardly opening channel adapted to nest about said opening defining edge of said vehicle fender.

5. For disposition over the wheel opening of a vehicle fender of the type having an underturned wheel opening defining edge, as an article of manufacture, an ornamental fender shield having an edge adapted to overlie said opening defining edge of said fender, said shield edge being bent back on itself to form a recess, a fastening strip adapted to secure said shield to said fender having an edge portion disposed within said recess, and means in proximity to the base of said shield for biasing said strip upwardly into tight engagement in said recess.

6. For disposition over the wheel opening of a vehicle fender of the type having an underturned wheel opening defining edge, as an article of manufacture, an ornamental fender shield having an edge adapted to overlie said opening defining edge of said fender, said shield edge being bent back on itself to form a recess, a fastening strip adapted to secure said shield to said fender having an edge portion disposed within said recess, and a pair of arms having jaws adapted to receive and hold the lower ends of said strip, thereby to retain said strip in desired position in said recess.

7. For disposition over the wheel opening of a vehicle fender of the type having an underturned wheel opening defining edge, as an article of manufacture, an ornamental fender shield having an edge adapted to overlie said opening defining edge of said fender, said shield edge being bent back on itself to form a recess, a fastening strip adapted to secure said shield to said fender having an edge portion disposed within said recess, and a pair of strip-supporting arms adapted to detachably engage and support the lower ends of said strip, thereby to retain said strip in tight engagement within said recess.

GEORGE W. SCHATZMAN.